United States Patent Office 3,698,859
Patented Oct. 17, 1972

3,698,859
PROCESS FOR PREPARING A COPPER CHROMITE CATALYST
Terrance J. Velten, Glen Burnie, Md., assignor to W. R. Grace & Co., New York, N.Y.
No Drawing. Filed June 23, 1971, Ser. No. 156,110
Int. Cl. C01g 3/00, 37/00
U.S. Cl. 23—56                                                6 Claims

ABSTRACT OF THE DISCLOSURE

An active copper chromite hydrogenation catalyst is prepared in essentially a three-step process using basic copper carbonate, chromic acid, ammonium hydroxide, an ammonium carbonate. The result is the formation of a basic copper ammonium chromate intermediate which is subsequently decomposed by calcination to copper chromite. A distinct advantage of the process is that environmental contamination is minimized, with carbon dioxide being essentially the only effluent which is vented. Liquid waste by-product is essentially non-existent.

---

This invention relates to a process for preparing a catalyst suitable for use in hydrogenating unsaturated organic compounds. In a particular aspect it relates to a process for preparing a copper chromite catalyst employing steps and reactants which are designed to avoid the formation of undesired by-products.

Most chemical plants generally evolve measurable quantities of one or more effluents in a gaseous, liquid, or solid form at some point in the process. Air and water pollution from chemical plants can be caused by a variety of materials, some of which are particularly unpleasant and have a deleterious effect on the health of people who are exposed to these materials. Pollution of both air and water may be nuisances even when the materials are objectionable only from an esthetic or personal point of view.

The public has become increasingly anxious to maintain the highest reasonable purity of both air and water resources, and local, state, and federal governmental groups have passed laws and regulations to control the flow of these effluents. It stands to reason that it is more desirable to design and arrange plant operations with the view of preventing formation of any pollutants but this desire is not always realized. Consequently, the chemical industry must provide some means for treating undesirable by-products in carrying out its operations. Such treatment includes filtration of the by-product, scrubbing, use of mechanical separating equipment, and physical removal from the plant to an off-site area. Any by-product handling adds to the manufacturing cost of the main product.

It is therefore an object of this invention to provide a process which enables the preparation of an active copper chromite hydrogenation catalyst while avoiding formation of objectionable effluents. This objective is achieved by employing basic copper carbonate, chromic acid, ammonium carbonate, and ammonium hydroxide as essential ingredients and carrying out the process in a controlled step-wise manner. In general, the process is carried out by (1) reacting one-half of the requisite amount of basic copper carbonate with chromic acid to form a copper dichromate solution, (2) separately reacting the remainder of the copper carbonate with ammonium hydroxide in the presence of ammonium carbonate to form a tetrammine copper complex solution, and then (3) slowly adding the solution from step (1) to the step (2) solution to form a slurry containing a basic copper ammonium chromate intermediate. The intermediate is recovered and decomposed to copper chromite by calcination.

In this process, there is no liquid waste product since all filtrates are recycled for reuse. The use of the recycled material provides an economic advantage while avoiding the flow of pollutants into the atmosphere. The only effluents which are released are carbon dioxide and nitrogen and these gases are not considered objectionable since they are normally present in the composition of the atmosphere.

In carrying out the process, the first step involves the formation of a copper dichromate solution using basic copper carbonate and chromic acid as reactants. The reaction proceeds as shown in Equation I:

(I) $CuCO_3 \cdot Cu(OH)_2 + 4CrO_3 \rightarrow 2CuCr_2O_7 + H_2O + CO_2$

Chromium tri-oxide is dissolved in water to form an acid solution containing between about 30 to 35 percent $CrO_3$. About 50 percent by weight of the requisite amount of basic copper carbonate is added carefully to the acid solution to prevent excessive foaming or misting from the evolved carbon dioxide. The basic copper carbonate may be either malachite, as illustrated in the above equation, or azurite, $2CuCO_3 \cdot Cu(OH)_2$.

In the second step, the remaining 50 percent of the copper carbonate is reacted with ammonium hydroxide in the presence of ammonium carbonate to form cupric tetrammine carbonate as shown in Equation II:

(II) $CuCO_3 \cdot Cu(OH)_2 + 6NH_4OH$
$+ 2(NH_4)_2CO_3 \rightarrow + 2Cu(NH_3)_4CO_3 + 8H_2O$ In this reaction, ammonium hydroxide having a concentration of 28 percent $NH_3$ is used but, if desired, anhydrous ammonia may be employed instead. The ammonium carbonate although employed as a reactant need be added to the system only in the start-up operation, since its function is subsequently satisfied by its presence in the recycled filtrate or otherwise as hereinafter described under the heading "Final Processing."

The third step involves the reaction of the solutions from Equations I and II as shown in the following Equation III:

(III) $CuCr_2O_7 + Cu(NH_3)_4CO_3$
$+ 3H_2O \rightarrow 2Cu(OH)NH_4CrO_4 + (NH_4)_2CO_3$ The solution from Equation I is slowly added with agitation to the solution of Equation II whereby the basic copper ammonium chromate is precipitated. The order of addition is important as a reverse addition would cause an evolution of carbon dioxide.

None of the reactions illustrated in the three equations generates an excessive amount of heat and the maximum temperature reached for any one of the reactions is about 150° F. The process therefore need not be interrupted to provide a cooling period.

FINAL PROCESSING

The slurry of Equation III may be treated according to one of the following three methods:

(1) The slurry is spray dried followed by calcination of the dried product. The aqueous slurry containing the precipitated basic copper ammonium chromate and ammonium carbonate is passed from the precipitation tank to a spray dryer maintained at a temperature of about 250° F. to 450° F. The dried product is then passed to a rotary calciner operating at a temperature ranging between about 400° F. and 900° F. whereby the basic copper ammonium chromate is decomposed to copper chromite ($2CuO \cdot Cr_2O_3$). Gaseous nitrogen and water are evolved which are directed to a collector and thence to a scrubber. Gaseous nitrogen and water vapor are evolved during calcination and these are collected and treated in a wet scrubber. All off-gases and dusts are treated in the scrubber with sulfuric acid, resulting in the evolution of carbon dioxide and nitrogen which are released to the atmosphere. Ammonium sulfate which is precipitated in the scrubber is recovered for appropriate disposition.

(2) In this method, the slurry from Equation III containing the basic copper ammonium chromate and ammonium carbonate is passed to a filter and the resulting wet filter cake is fed directly to a rotary calciner. The wet cake has a moisture content ranging between about 50 percent and 55 percent. The rotary calciner is effectively operated at a temperature ranging between about 400° F. and 900° F. The off-gases from the calciner are scrubbed for recycling of the ammonia. The filtrate composed of hexavalent chromium, divalent copper, and ammonium ions is recovered and passed to a tank for reuse in the reaction as illustrated in Equation II.

(3) In this method, the slurry from Equation III is filtered and the filter cake having a moisture content of between about 50 to 55 percent is passed to a drying oven. The oven is maintained at a temperature ranging between about 150° F. and 350° F. and the residence time of the cake in the oven ranges between about 4 and 16 hours at which time the cake has been dried to a total volatile content of between about 27 and 36 percent. Any ammonium carbonate present in the cake is decomposed at the drying temperatures. The dry cake consisting essentially of basic copper ammonium chromate can then be ground to essentially any desired particle size. A useful size is about 6 mesh. This is then calcined at a temperature between about 400° F. and 900° F. The filtrate is recovered for subsequent recycling in the process.

The recycling of the filtrate in methods (2) and (3) is advantageous for two reasons. First, the filtrate has a high concentration of hexavalent chromium, divalent copper, and ammonium ions which are useful in Step II of the cycle. Second, disposal of the filtrate would be difficult as well as costly with respect to chemical loss and effluent treatment.

Calcination of the basic copper ammonium chromate yields active copper chromite as postulated in the following reaction:

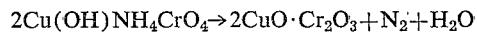

$$2Cu(OH)NH_4CrO_4 \rightarrow 2CuO \cdot Cr_2O_3 + N_2 + H_2O$$

The invention is further illustrated by the following examples:

Examples 1 to 10

Ten separate batches were prepared using the filtering and drying technique described under method (3) above. Each batch was composed of the following ingredients:

| Ingredient: | Amount |
|---|---|
| Chromic acid | lbs__ 80.6 |
| Malachite, 55% Cu | lbs__ 92.8 |
| Ammonium hydroxide (28% NH$_3$) | gals__ 10 |
| Ammonium carbonate monohydrate | lbs__ 23 |

The ammonium carbonate was used only in the first batch. Its function was satisfied by recycling the filtrate from the previous batch to the succeeding batch.

Batch 1 was prepared by dissolving the chromic acid in water and then adding one-half (46.4 pounds) of the malachite thereto. The ingredients were thoroughly mixed for 30 minutes at which time the reaction was complete, resulting in a copper dichromate solution.

Ammonium carbonate was dissolved in a sufficient amount of water in a second tank and then followed by the addition of ammonium hydroxide. The remaining 46.4 pounds of malachite were then charged to this solution. The ingredients were thoroughly mixed for 30 minutes, resulting in the formation of cupric tetrammine carbonate.

The dichromate solution was then combined with the cupric tetrammine carbonate solution. As pointed out before, the order of addition is important to avoid evolution of carbon dioxide. The solutions were agitated for 30 minutes thereby yielding a slurry containing basic copper ammonium chromate.

Batches 2 to 10 were prepared in the same manner as batch 1 except that fresh ammonium carbonate was not employed. Its function was served by the filtrate which was recovered when the basic copper ammonium chromate was filtered from the slurry. The recovered filtrate was recycled to the tank where the cupric tetrammine carbonate was formed.

All filtrate of one batch was saved and used for dissolving 50 percent of the malachite in the reaction illustrated in Equation II of the following batch. It was important that the volume of filtrate did not increase, within limits, from batch to batch. Any increase in filtrate volume above the volume required for the Equation II reaction was partially offset by decreasing the volume of the solution of Equation I. A progressive increase in filtrate volume would present disposal and pollution problems. However, no such problems arose in preparing batches 2 to 10 and these batches employed the total recycled filtrate.

The initial concentration levels of Cu, Cr, CO$_2$, and NH$_3$ were established for the filtrate and were used for comparison with subsequent batches. Spot analyses of certain subsequent batches revealed that no buildup or depletion of these materials occurred. A buildup of Cu or Cr would have indicated a possible limit to the total recycle at some point in the process. The level of CO$_2$ assured a complete Equation II reaction without the addition of any ammonium carbonate.

The filter cake from the ten batches having a total volatile content ranging between 50 to 55 percent was dried in an oven maintained at a temperature of about 250° F. All cake was dried over a period of about 50 hours, yielding 1563 pounds of dried cake having an average total volatile content of about 30.84 percent at 1750° F.

The dried basic copper ammonium chromate cake was granulated through an 8 mesh screen and fed to a rotary calciner which was maintained at a temperature ranging between about 800° F. and 835° F. Conversion of the chromate to copper chromite by calcination was exothermic and gases produced during the reaction were channeled to a scrubber. Average analysis of the resulting copper chromite was as follows:

| | |
|---|---|
| Total volatile content at 1750° F., percent | 6.61 |
| Cu, percent by weight | 39.09 |
| Cr, percent by weight | 32.8 |
| NH$_3$, percent by weight | 0.0075 |
| X-ray peak height, cm. | 4.95 |
| Surface area (N$_2$ method), m.$^2$/g. | 44.3 |

The X-ray peak height determination refers to the height (in centimeters) of a band appearing in the X-ray diffraction pattern of the copper chromite catalyst at an angle of 35.59° 2$_\theta$ ($d$=2.52 A.). The pattern was measured on a Norelco X-ray powder diffractometer using CuKa radiation. The peak height determination is a measure of the relative size of the CuO crystallites in the catalyst.

The catalyst is useful in hydrogenating esters, such as dimethyl adipate, methyl oleate and methyl laurate; aldehydes, such as butyraldehyde and croton aldehyde; ketones and ethers to the corresponding alcohols. In addition, nitro compounds may be reduced to corresponding amino compounds in the presence of the catalyst.

As described above, the present invention provides a feasible process for preparing an active hydrogenation catalyst which is economical in that the filtrate is recycled in the system. Thus there is little or no waste material which would require processing or disposition to avoid contaminating the surrounding atmosphere.

I claim:
1. A process for preparing a hydrogenation catalyst which comprises the steps of
    (a) dissolving about one-half of the amount of basic copper carbonate which is required to provide the necessary copper value in the final catalyst in a chromic acid solution to form copper dichromate,
    (b) dissolving the remaining amount of basic copper carbonate in a solution containing ammonium hydroxide and ammonium carbonate to form cupric tetrammine carbonate,
    (c) adding the solution from step (a) to the solution of step (b) to form a slurry containing basic copper ammonium chromate, and
    (d) converting the basic copper ammonium chromate to copper chromite.

2. A process according to claim 1 wherein the slurry formed in step (c) is dried and the resulting dried basic copper ammonium chromate is subjected to the conversion of step (d).

3. A process according to claim 1 wherein the slurry formed in step (c) is filtered and the resulting filter cake composed of basic copper ammonium chromate is subjected to the conversion of step (d).

4. A process according to claim 1 wherein the slurry formed in step (c) is filtered, the resulting filter cake composed of basic copper ammonium chromate is dried, and the dried cake is subjected to the conversion of step (d).

5. A process according to claim 3 wherein the resulting filtrate is recycled for subsequent use in place of the ammonium carbonate in step (b).

6. A process according to claim 4 wherein the resulting filtrate is recycled for subsequent use in place of the ammonium carbonate in step (b).

References Cited

UNITED STATES PATENTS

| | | | |
|---|---|---|---|
| 2,031,475 | 2/1936 | Frazer | 252—467 X |
| 2,205,141 | 6/1940 | Heard | 23—56 X |
| 3,374,184 | 3/1968 | McEvoy et al. | 252—467 |
| 3,547,972 | 12/1970 | Drinkard | 252—467 X |

Calingaert et al.: "Industrial and Engineering Chemistry," vol. 26, 1934, pp. 878–880.

Stroupe, "Journal of The American Chemical Society," vol. 71, 1949, pp. 569–572.

HERBERT T. CARTER, Primary Examiner

U.S. Cl. X.R.

23—359; 252—467, 476